April 16, 1940.    B. A. FREDELL    2,197,266
STEP SUPPORT
Filed April 11, 1939
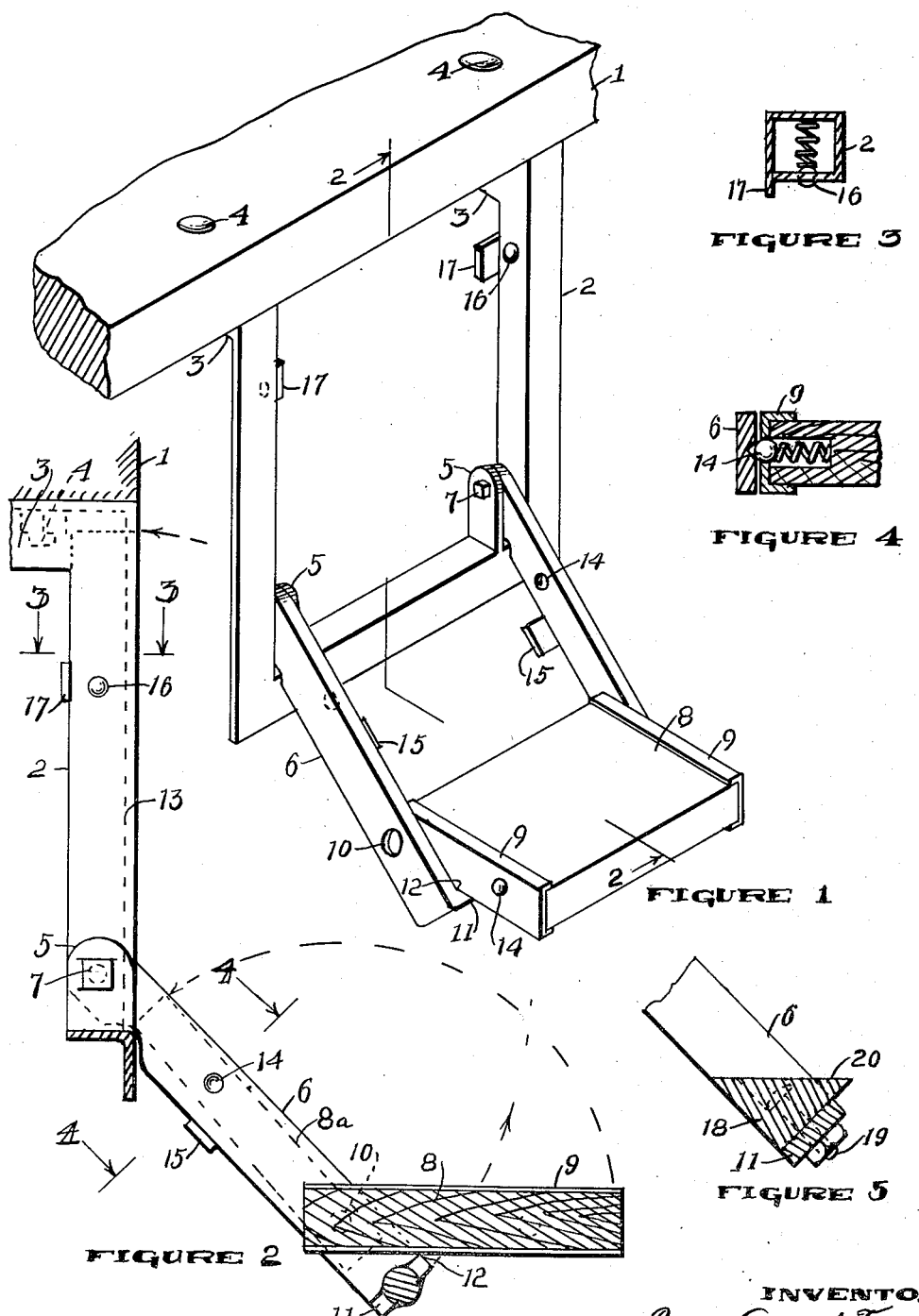
INVENTOR
Bror August Fredell
John A. Naismith
ATTORNEY Patented Apr. 16, 1940

2,197,266

UNITED STATES PATENT OFFICE 2,197,266

STEP SUPPORT

Broy August Fredell, San Jose, Calif.

Application April 11, 1939, Serial No. 267,309

1 Claim. (Cl. 280—166)

The present invention relates particularly to a step structure as applied to a truck, wagon, other vehicle, or stationary or movable platform, particular reference being made to the truck for the purpose of disclosure only.

Since the advent of the truck in the commercial field, reference being made, of course, particularly to the motor driven truck, it has been adapted for use in the transportation of commodities of many kinds and types. In so adapting the truck the body thereof has assumed a great variety of forms. That is, the floors of various trucks vary in thickness; some truck bodies are without sides, some have sides built integrally therewith, some are fitted with removable sides; some truck bodies are unobstructed along the under side of their outer edges, and some are obstructed with structural elements along the edges.

The result of the above outlined condition is that trucks are not provided with convenient and readily available steps for use in the loading and unloading thereof, forcing the truckman to climb on and off in those operations and subjecting him to the danger of more or less serious injury, as well as adding materially to the labor required in the loading and unloading operation.

It is, therefore, one object of the present invention to provide a step structure that may be adapted for application to a truck of any form regardless of the nature of its structural details, whereby the truckman may ascend to the body of the truck or descend therefrom as easily as he may enter or leave a truck cab.

It is another object of the invention to provide a device of the character indicated that may be readily disposed within the area defined by the truck body when not in use, and quickly and easily extended beyond the area of the truck body and lowered to a convenient position for use in the one operation.

It is a further object of the invention to provide a structure of the character indicated that will be economical to manufacture, simple in form and construction, strong, durable, and highly efficient in its practical application.

In the drawing:

Figure 1 is a perspective view of one form of my improved step structure as applied to a truck body.

Figure 2 is a sectional view on line 2—2 of Figure 1.

Figure 3 is a detail section on line 3—3 of Figure 2.

Figure 4 is a detail section on line 4—4 of Figure 2.

Figure 5 is a detail section of a portion of another embodiment of the invention.

Referring now more particularly to the drawing, I show at 1 a portion of a truck body. At 2 is shown a frame made of angle-iron, and at 3—3 are arms formed integrally with the frame and projecting laterally from one end thereof to underlie the truck body 1 to which they are secured by means of bolts as 4.

Formed integrally with the bottom member of the frame 2 and in parallel relation with the inner opposed surfaces of the frame are upstanding lugs 5—5.

At 6 is shown a U shaped member having its ends inserted between the lugs 5 and the adjacent sides of the frame and pivotally supported therein by means of bolts as 7. These parts are so formed and proportioned that when the member 6 is swung outwardly and downwardly of the frame it will lie at an angle of approximately forty-five degrees relative to the plane of the frame 2, and when swung upwardly and inwardly it will pass within, and be encompassed by, the said frame.

At 8 is shown a wood step having end plates as 9 mounted thereon and pivotally mounted on the member 6 as at 10. The pivotal mounting of the step is so positioned that when the step is extended in position for use it will rest upon and be supported by the closed end 11 of the U shaped member as at 12, and when swung upwardly and inwardly of the U shaped member it will assume the position shown in dotted lines at 8a.

The result of this construction is that the frame 2 may be mounted on the floor of a truck body to depend therefrom and with its outer surface flush with the edge of the body, the step 8 being extended beyond the edge of the body and in a convenient position for use when unfolded.

When the step is not to be used it is folded into the plane of the member 6 as described, and then the member 6 is folded into the plane of the frame 2 as indicated in dotted lines at 13, in which position there are no parts projecting beyond the area of the body 1.

In order to releasably hold the step 8 securely in position in the member 6 when folded therein as described I provide the same with spring-pressed ball friction catches as shown at 14, and to prevent its swinging through the member I mount stops as 15 on the rear edges of the member as shown.

To releasably hold the member 6 securely in place in the frame 2 when folded therein I provide the same with spring-pressed ball friction catches as shown at 16, and to prevent the member 6 from swinging through the frame I mount stops as 17 on the rear edges of the frame.

In the form of the invention shown in Figure 5 the step is not hinged or pivotally mounted on the member 6, but comprises a triangular member 18 that is seated on the part 11 and bolted thereto as at 19 with one surface 20 lying in a horizontal plane when the step is extended, this surface forming the tread.

Although certain specific embodiments of the invention have been herein illustrated and described, it will be understood that various alterations in the details of construction and mode of assembly may be made without departing from the scope of the invention as indicated in the appended claim.

I claim:

The combination of a platform, a rectangular frame rigidly mounted thereon to depend vertically from one edge thereof and having an upstanding lug disposed on its bottom end adjacent and paralleling each side thereof, a U shaped member having its ends pivotally associated with said lugs and adjacent frame portions and disposed to swing either into the plane of the frame or into engagement with the bottom thereof whereby to be angularly supported relative to the plane of the frame, and a tread on the closed end of the pivoted member.

BROR AUGUST FREDELL.